United States Patent [19]

Baranyi

[11] Patent Number: 5,123,882
[45] Date of Patent: Jun. 23, 1992

[54] COMPOUND PLANOCENTRIC CYCLOIDAL GEAR DRIVES WITH ORTHOGONAL PLANET ARRANGEMENTS

[75] Inventor: Sandor J. Baranyi, Riverton, Wyo.

[73] Assignee: Trogetec, Inc., Riverton, Wyo.

[21] Appl. No.: 774,238

[22] Filed: Oct. 10, 1991

[51] Int. Cl.⁵ ............................................. F16H 13/08
[52] U.S. Cl. ..................................... 475/177; 475/178
[58] Field of Search ........................ 475/176, 177, 178

[56] References Cited

U.S. PATENT DOCUMENTS

| | | | |
|---|---|---|---|
| 1,467,773 | 9/1923 | Bennett | 475/178 |
| 1,578,965 | 3/1926 | Eck | 475/178 X |
| 3,129,611 | 4/1964 | Lee | 475/179 |
| 4,297,920 | 11/1981 | Richter | 475/178 |
| 4,884,473 | 12/1989 | Lew | 475/177 X |
| 4,898,065 | 2/1990 | Ogata et al. | 475/178 X |

Primary Examiner—Dirk Wright
Attorney, Agent, or Firm—Shlesinger Fitzsimmons Shlesinger

[57] ABSTRACT

A pinion shaft has thereon a sun gear for imparting rotational motion to or to be rotated by a pair of planetary gears which rotate about space axes extending parallel to and lying in a first plane containing the axis of said shaft. Each of a pair of planocentric compound cycloidal discs has an internal set of gear teeth constantly meshing with the teeth of the planetary gears, and an external set of cycloidal teeth engaged with the cylindrical teeth of a ring gear that is rotatable coaxially of the shaft. The cycloidal discs rotate eccentrically about the axis of the shaft, and respectively, about a second pair of axes extending parallel to and equispaced from diametrally opposite sides of said shaft, and lying with the axis of the shaft in a second plane that extends normal to the first plane. During operation the eccentrically displaced rotational axes of the compound cycloidal discs may revolve about the axis of the shaft, and in so doing the two planes containing the axes of rotation of the planet gears and discs, respectively, always intersect along the rotational axis of the shaft, at right angles.

13 Claims, 2 Drawing Sheets

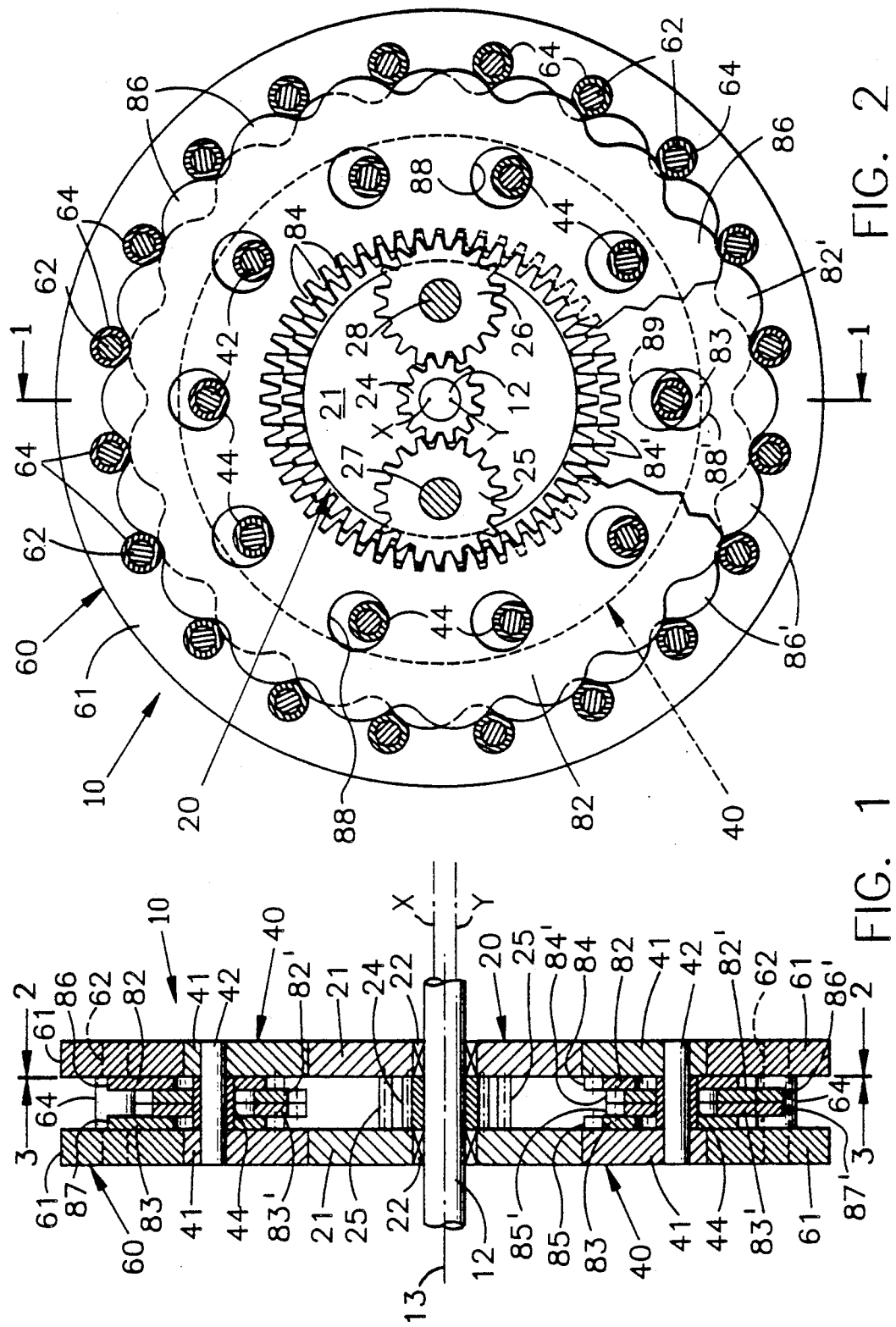

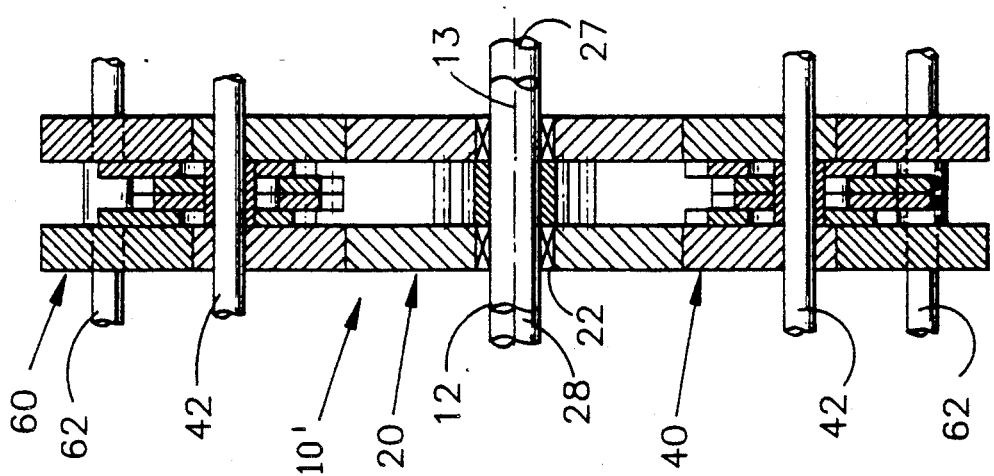
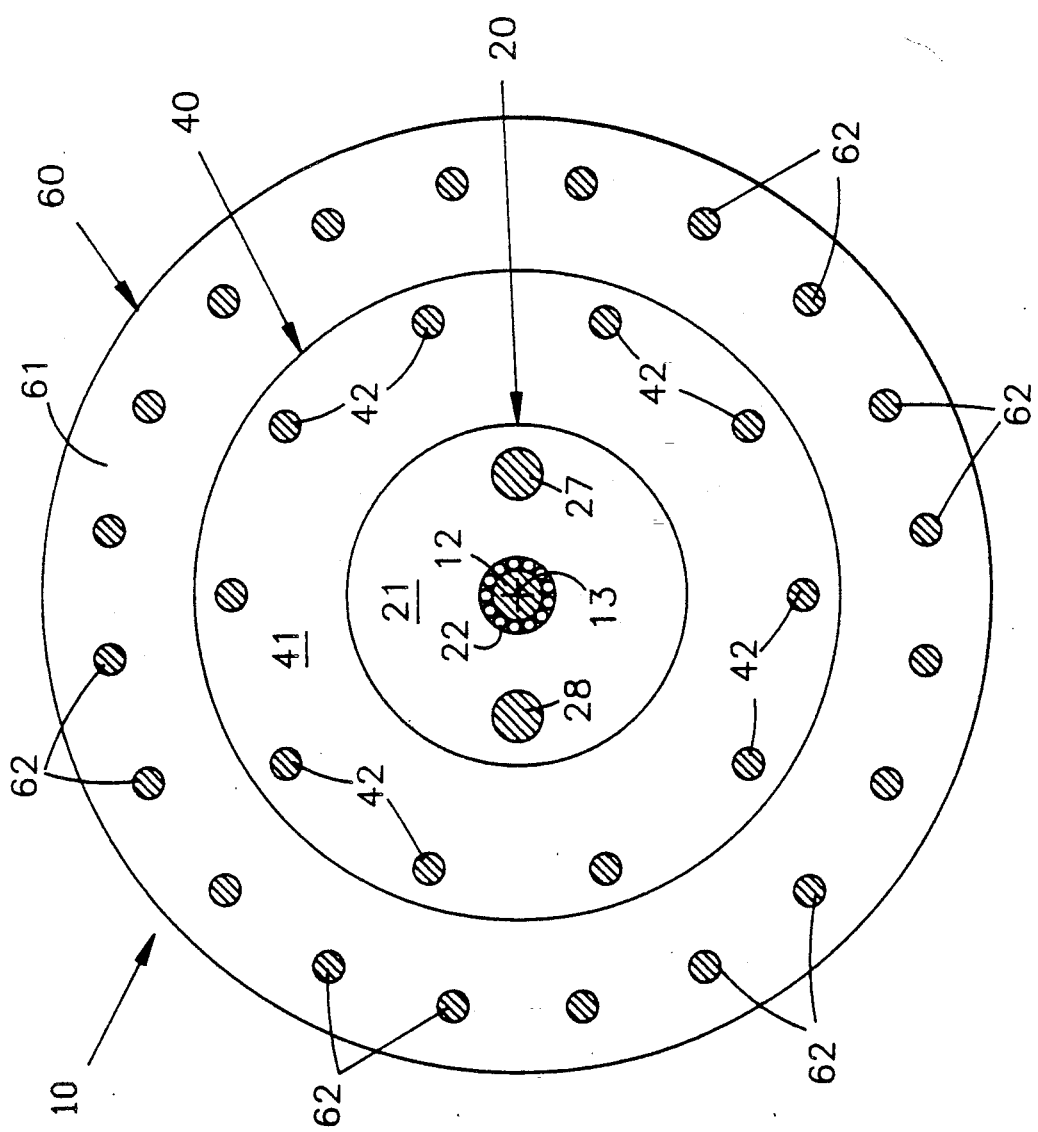

5,123,882

COMPOUND PLANOCENTRIC CYCLOIDAL GEAR DRIVES WITH ORTHOGONAL PLANET ARRANGEMENTS

BACKGROUND OF THE INVENTION

This invention relates to a gear-type rotary speed changer, and more particularly to the type of speed changer having a planetary gear set. Even more particularly, this invention relates to a speed changer having compound planocentric gear drives and an orthogonally arranged planetary gear set.

It is well known to one skilled in the art that a planetary gear set may be utilized for transmitting rotational torque in speed changing devices. Heretofore, it has also been customary to utilize cycloidal gear sets in speed changing devices such as those disclosed in U.S. Pat. Nos. 3,129,611, 4,297,920, 4,884,473 and 4,898,065. Of these previously disclosed speed changing devices, only two have coupled the cycloidal gear with a planetary gear set. Each of these speed changing devices, U.S. Pat. Nos. 3,129,611 and 4,898,065, have the cycloidal gear set connected to the planetary gear set by means of eccentric shaft structures.

However, as disclosed herein, the speed changer according to this invention maintains a compound planocentric gear set in a balanced, constant toothed engagement with the planetary gear set. This arrangement reduces the amount of wear that normally affects the gear teeth, and therefore the lifetime of the device itself. Also, prior such speed changing devices, although capable of high speed reduction ratios, were often limited by the number of speed reduction ratios capable of being created by a single device.

It is therefore an object of this invention to provide a compound planocentric cycloidal speed changer having multiple reduction ratios, including high speed reduction ratios.

It is also an object of this invention to provide a speed changer that is constantly well balanced and thus less susceptible to wear.

Another object of this invention is to provide a speed changer which is compact with respect to its load bearing capabilities.

Still other objects of this invention will become apparent to those skilled in the art when the preferred embodiments are considered in conjunction with the accompanying drawings and the appended claims.

SUMMARY OF THE INVENTION

A compound planocentric gear drive with orthogonal planet arrangements, in accordance with the embodiments of this invention, is capable of creating a number of speed reduction ratios involving a variation of the driving and driven members of the speed reducing device. A pinion shaft imparts rotational motion to a planetary gear set, and alternatively, either a coaxial sun gear or a coaxially situated planet gear carrier may function as the driving member. Driven members may include the planet gear carrier, spider gear, or ring gear, each of which is coaxial with the pinion shaft and disposed concentrically about the pinion shaft in a parallel, bi-planar relationship.

Rotational motion is transferred from driving member to driven member by means of at least one pair of compound cycloidal gears, each pair having opposed rotational axes which are eccentrically displaced from the rotational axis of the pinion shaft so that the three rotational axes are parallel and occupy a single plane. That is, during operation the eccentrically displaced rotational axes of the compound cycloidal gears are constantly revolving about the axis of the pinion shaft, and in so doing always maintain their planar relationship. Also, the planetary gears maintain an orthogonal relationship with the compound cycloidal gears such that the plane containing the rotational axes of the pinion shaft and planetary gears will always be perpendicular to the plane containing the rotational axes of the pinion shaft and compound cycloidal gears, such planes intersecting along the rotational axis of the pinion shaft.

BRIEF DESCRIPTION OF THE DRAWINGS

FIG. 1 is an axial section view of a compound planocentric planetary gear device made according to one embodiment of this invention as seen when taken generally along the line 1—1 in FIG. 2 looking in the direction of the arrows;

FIG. 2 is an end elevational view of this device with portions thereof broken away and shown in section;

FIG. 3 is a sectional view taken along the line 3—3 in FIG. 1 looking in the direction of the arrows; and FIG. 4 is a view similar to FIG. 1 but showing a modified device in which selected portions thereof may extend beyond opposite ends of the device to permit selective coupling of the ring gear, spider gear or planet carrier thereof to other devices.

DETAILED DESCRIPTION OF THE PREFERRED EMBODIMENTS

Referring now to the drawings by numerals of reference, and first to the embodiment shown in FIGS. 1 to 6, a numeral 10 denotes generally a speed reducing device comprising a drive shaft 12, which is journaled to be rotated coaxially about its axial centerline by conventional means, not illustrated. Mounted on shaft 12 are four distinct units, three of which are denoted, respectively, as a planetary gear set 20, a spider gear 40, and a ring gear 60. The fourth unit comprises a plurality of eccentric members or cycloidal gears which will be described in greater detail hereinafter.

Referring to FIGS. 1 to 3, planetary gear set 20 comprises a pair of identical, axially spaced, annular end plates or planet carriers 21, which are mounted on a pair of axially spaced roller bearings 22 for rotation coaxially on shaft 12 in spaced, parallel planes. A spur or sun gear 24 is keyed or otherwise secured coaxially to shaft 12 for rotation thereby between plates 21. Sun gear 24 has a set of spurical teeth which are drivingly engaged with the teeth of a pair of orbitally opposed planetary gears 25 and 26, which are mounted to rotate adjacent diametrally opposite sides of gear 24 on parallel support shafts 27 and 28, respectively. Shafts 27 and 28 are secured to and extend transversely between the planet carrier plates 21 in such manner that the axes of shafts 27 and 28 define a plane which also contains the rotational axis of shaft 12.

Spider gear 40 is rotatably supported upon and surrounds the planetary gear set 20 coaxially thereof. It comprises a pair of identical annular plates or rings 41 which are mounted to rotate in coplanar relation upon, and concentrically about, planet carrier plates 21. The rings or plates 41 are interconnected by a plurality of roller supporting pins 42 (ten in the embodiment illustrated) which are secured at opposite ends thereof in plates 41 to extend transversely therebetween parallel to the axis 13 of shaft 12, and in equispaced radial and angular relation thereto. Each of pins 42 is surrounded by a rotatable roller or annular barrel 44 which functions as a roller tooth that mechanically engages eccentric cycloidal gears of the type noted hereinafter.

Rotatably supported upon and surrounding the spider gear 40 coaxially thereof is the ring gear, which in the drawing is denoted generally by the numeral 60. Ring gear 60 comprises two, identical, axially spaced annular rings or plates 61 which are mounted to rotate in coplanar relation upon, and concentrically about rings 41 of spider gear 40. Plates 61 are connected by a plurality of parallel roller supporting pins 62 which are fastened at opposite ends to plates 61 to extend transversely therebetween, and which likewise are equispaced radially and angularly about the axis 13 of shaft 12. Each of the pins 62 is surrounded by a rotatable roller or annular barrel 64 which, as in the case of rollers 44, is designed to function as a roller tooth, and mechanically to engage cycloidal gear members of the type noted hereinafter.

Surrounding the sun and planetary gear system 24, 25 and 26 in the axial space between the coplanar sets of end plates 21, 41 and 61 are two annular pairs of eccentrically opposed, identical compound cycloidal gears 82, 82′ and 83, 83′, respectively. Each of the compound cycloidal gears 82, 82′, 83 and 83′ has formed thereon a set of internal spurical gear teeth 84, 84′ and 85, 85′, respectively, a set of external lobed teeth 86, 86′, 87 and 87′, respectively, and has therethrough a plurality of cylindrical holes 88, 88′, 89 and 89′, respectively. These holes are of like diameter; they are radially and angularly equispaced along a uniform pitch diameter; and they are equal in number to roller teeth 44 o spider 40.

As will be apparent from the drawings, roller teeth 44 extend through registering portions of the openings or holes 88, 88′, 89 and 89′, so that upon rotation of spider 40 the roller teeth 44 will impart rotation to the cycloidal gears 82, 82′, 83 and 83′, and vice versa. Also as shown in the drawings, the diameters of roller teeth 44 are equal to each other, but are smaller in diameter than the openings 88, 88′, 89 and 89′. The reason for this is that the axis of rotation X (FIGS. 1 and 2) of the eccentric members or compound cycloidal gears 82 and 83 is radially offset in one direction from the axial centerline 13 of shaft 12, while the axis of rotation Y of the opposed gears 82′ and 83′ is radially offset a like distance from the diametrally opposite side of axis 13. Thus, when the device is placed in operation, the openings 88, 88′, 89 and 89′ permit slight radial shifting of gears 82 and 83 relative to the eccentrically opposed gears 82′ and 83′.

Also as will be apparent from an examination of the drawings, a plane containing the axes of the sun and planetary gears 25–27 is, and will remain as noted hereinafter, at right angles to a plane containing the axes X, Y and 13. As a consequence planet gears 25 and 26 are maintained in constant toothed engagement with the internal gears of members 82, 82′, 83 and 83′. In the embodiment illustrated, the number of lobed teeth forming the external gear on each of members 82, 83, 82′ and 83′ is at least one less than the number of roller teeth 64 on ring gear 60. By means of their external teeth, their cylindrical holes, and internal gear teeth, the compound cycloidal gears 82, 82′, 83 and 83′ may impart rotation from planetary gearing system 20 to ring gear 60, spider 40 or planet carriers 21. As noted in the following examples, selection of these driven members depends upon locking the ring gear 60 or spider 40 against rotation, as for example where either one may alternatively be locked, thereby selecting the other member for rotation.

For the purpose of describing the various reduction ratios that can be achieved as noted in the following examples, the respective sets of gear teeth, roller teeth and cycloidal lobes will be identified by the following letters:

A - The teeth on pinion gear 24.
B - The teeth on each of planetary gears 25 and 26.
C - The roller teeth 44.
D - The roller teeth 64.
E - The internal teeth (84, 84′, 85, 85′) on each of the four cycloidal gears or discs.
F - The external lobes (86, 86′, 87, 87′) on each of the four cycloidal gears or discs.

EXAMPLE 1

For this example let it be assumed that ring gear 60 is locked against rotation, thereby allowing spider 40 to become the driven member. In such instance clockwise rotation of pinion shaft 12 will impart clockwise rotation to sun gear 24, which therefore imparts counterclockwise rotation to planetary gears 25 and 26. Since the planetary gears are constantly engaged with the internal gear teeth of cycloidal gears 82, 82, 83 and 83′, they will impart clockwise rotation to planet carriers 21, and counterclockwise rotation to both the compound cycloidal gears 82, 82′, 83 and 83′ and the spider 40 via roller teeth 44, which extend through the cylindrical holes 88, 88′, 89 and 89′. The reduction ratio may be calculated by the formula:

$$R = [F/(F-D)][1+(D/F)(E/A)]$$

Where $f=19$, $D=20$, $E=48$, $A=12$ and $R=-99$, indicating that spider 40 will rotate in the direction opposite pinion shaft 12.

EXAMPLE 2

Assume now that spider 40 is fixed against rotation, and that compound cycloidal gears 82, 82′, 83 and 83′ are also fixed against rotation. In operation, clockwise rotation of pinion shaft 12 and sun gear 24 again will impart counterclockwise rotation to planetary gears 25 and 26. Planetary gears 25 and 26 being constantly engaged with the internal gear teeth of compound cycloidal gears 82, 82′, 83 and 83′ will cause clockwise rotation of the planet carriers 21. As planet carriers 21 rotate, planet gears 25 and 26 will simultaneously engage the four compound cycloidal gears 82, 82′, 83 and 83′, and therefore the rotation of the planet carriers 21 will cause the compound cycloidal gears 82, 82′, 83 and 83′ to actuate with respect to the planetary gears in order to maintain their orthogonal relationship. This actuated motion of compound cycloidal gears 82, 82′, 83 and 83′ will cause external gear lobes 86, 86′, 87 and 87′ to behave as camming surfaces with regards to roller teeth 64, thereby causing ring gear 60 to rotate clockwise each time the lobed teeth contact the roller teeth 64. The reduction ratio may be calculated by the formula:

$$R = [1+(E/A)][D/(D-F)]$$

Where $A=12$, $E=48$, $D=20$, $F=19$ and $R=100$, indicating that ring gear 60 will rotate in the same direction as pinion shaft 12.

EXAMPLE 3

Assume now that both ring gear 60 and spider 40 are fixed against rotation and planet carriers 21 behave as the driven member. Again, clockwise rotation of the pinion shaft 12 and sun gear 24 thereon cause planet gears 25 and 26 to rotate counterclockwise. Constantly engaged with the internal gear teeth of compound cycloidal gears 82, 82', 83 and 83', planet carriers 21 and actuate motion of compound cycloidal gears 82, 82', 83 and 83' in order to maintain an orthogonal relationship between themselves. Since ring gear 60 is locked, actuated motion of compound cycloidal gears 82, 82', 83 and 83' merely allows for rotation of planet carriers 21 with a reduction ratio according to the formula:

$$R = (1 + E/A)$$

Where A=12, F=48 and R=5, indicating that planet carriers 21 rotate in the same direction as pinion shaft 12.

EXAMPLE 4

Also, reduction ratios exist for operation of the device when planet carriers 21 behave as the driving member. When the ring gear 60 is fixed and the spider 40 is driven, the reduction ratio may be calculated according to the formula $R = F/(F-D)$. Since the number of external lobes present on each of the compound cycloidal gears 82, 82', 83 and 83' is always at least one less any number of roller teeth 64 present on ring gear 60, then this ratio will always be negative indicating that spider 40 will always rotate in the direction opposite both planet carriers 21. When spider 40 is fixed and the ring gear 60 is driven, the reduction ration may be calculated according to the formula $R = D/(D-F)$. In such case the ratio will always be positive indicating that ring gear 60 will always rotate in the same direction as planet carriers 21.

This embodiment is intended to be exemplitive and not limiting with regards to the arrangements set forth in the embodiment of this invention. Substitutions may affect the ratio of the planetary gearing system and/or the ratio of the number of ring gear roller teeth 64 to the number of external gear teeth F of compound cycloidal gears 82, 82', 83 and 83'. Thus, alternative reduction ratios may be obtained by substituting for the ring gear 60 and compound cycloidal gears 82,82', 83 and 83', and/or substituting for the planet gears 25 and 26, sun gear 24 and compound cycloidal gears 82, 82', 83 and 83'. Such modifications are intended to allow for the production of compound planocentric gear drives designed to accommodate a desired set of reduction ratios, but not limited to those particular sets of reduction ratios.

Moreover, further modifications of the device would allow the drive unit to behave as a speed multiplier as well as a speed reducer. For example, as shown in FIG. 4, 10' denotes a modified device comprising the extension of support pins 42 and 62, and the support shafts 27 and 28 beyond the outer lateral surfaces of annular rings 41, 61, and 21, respectively, whereby such extensions may be selectively coupled to driving means so that either ring gear 60, spider gear 40 or planet carriers 21 may singly behave as the driving member. For such use the extensions of pins 42 and 62, and shafts 27 and 28 may protrude from one or both outer lateral surfaces of the device.

While this invention has been illustrated and described in connection with only certain embodiments thereof, it will be apparent that it is capable of still further modification, and that this application is intended to cover any such modifications which may fall within the scope of one skilled in the art, and the appended claims.

I claim:

1. A speed changer, comprising
   a spurical sun gear mounted for rotation coaxially about a first, stationary axis,
   a planetary gear support mounted adjacent said sun gear for rotation coaxially of said first axis,
   a pair of planetary gears having spurical teeth meshing with the teeth of said sun gear at diametrally opposite sides thereof, and mounted on said support for rotation coaxially and respectively about a first pair of spaced axes extending parallel to and located in a first plane containing said first axis, and for translational movement by said support coaxially of said first axis,
   a pair of annular, compound cycloidal discs, each having formed around its inner periphery an inner set of spurical gear teeth meshing constantly with the teeth of each of said planetary gears, and having formed around its outer periphery a set of external, cycloidal teeth,
   means mounting said discs for rotation eccentrically about said first axis, and for rotation respectively and coaxially about a second pair of spaced axes extending parallel to said first axis, and located in a second plane which contains said first axis and extends normal to said first plane, and
   a ring gear mounted for rotation coaxially of said first axis, and having thereon a set of tooth elements having meshing engagement with the cycloidal teeth on said cycloidal discs thereby to transmit rotation between said discs and ring gear, respectively.

2. A speed changer as defined in claim 1, wherein each of said discs is a planocentric disc.

3. A speed changer as defined in claim 1, wherein
   said tooth elements on said ring gear comprise cylindrical teeth disposed to have camming engagement with said cycloidal teeth, and
   the difference between the number of said cylindrical teeth and said cycloidal teeth is one or greater.

4. A speed changer as defined in claim 1, wherein said cycloidal discs are identical, and said spaced axes of rotation of said discs are equi-spaced from opposite sides of said first axis.

5. A speed changer as defined in claim 1, wherein said planetary gears are equi-spaced from opposite sides of said first axis and are equi-angularly spaced about said first axis from said spaced axes of rotation of said discs.

6. A speed changer as defined in claim 1, wherein
   said discs are similar in configuration and each has therethrough a plurality of like circular openings spaced uniformly on a pitch circle disposed coaxially of the respective disc,
   said mounting means comprises a spider gear mounted for rotation coaxially of said first axis, and having thereon a first plurality of like cylindrical pins spaced uniformly about a pitch circle disposed coaxially of said first axis and having the same diameter as the pitch circle for said circular openings, and said pins are equal in number to and extend loosely through said circular openings in each of said discs, thereby to permit limited radial movement of said discs relative to said first axis.

7. A spaced changer as defined in claim 6, wherein each of said first plurality of pins is surrounded by an angular roller, and the outer diameter of each such roller is less than the diameter of each of said circular openings in said discs.

8. A speed changer as defined in claim 7, wherein the difference between the diameter of each of said circular holes, and the outer diameter of the annular roller extending therethrough, equals twice the radial distance between said first axis and one of said spaced axes of rotation of said discs.

9. A speed changer as defined in claim 6, including means for selectively securing said ring gear and said spider gear, respectively, against rotation about said first axis.

10. A speed changer as defined in claim 6, wherein said spider comprises a first member mounted on said planetary gear support for rotation relative thereto coaxially of said first axis, and said pins project axially from said first member and through said circular opening in said discs, said ring gear comprises a second member mounted on said first member for rotation relative thereto coaxially of said first axis, and said tooth elements comprise a second plurality of cylindrical pins projecting axially from said second member parallel to said first plurality of pins, and into overlapping engagement with the cycloidal teeth on said discs.

11. A speed changer as defined in claim 6, including a second planetary gear support mounted to rotate coaxially of said first axis in axially spaced relation to the first-named planetary gear support, a shaft journaled adjacent opposite ends thereof in said axially spaced supports for rotation coaxially of said first axis, and having said sun gear secured thereon for rotation between said supports, and two further shafts extending between said supports and operatively supporting said pair of planetary gears for rotation in the axial space between said supports, and around the outside of said sun gear 12. A speed changer as defined in claim 11, wherein said spider gear comprises a first pair of annular members mounted on said axially spaced supports to rotate coaxially thereof, and in axially spaced relation to each other, a second pair of annular, compound cycloidal discs, each of which is similar in configuration to the discs of the first-named pair thereof, is mounted with said first-named pair of discs for rotation therewith between said first pair of annular members, and eccentrically of said first axis, and said pins are mounted adjacent opposite ends thereof in said first pair of annular members, and extend intermediate their ends loosely through said circular openings in each of said discs.

13. A speed changer as defined in claim 12, wherein said ring gear comprises a second pair of annular members mounted on said first pair of annular members to rotate coaxially thereof, and in coaxial spaced relation to each other and said tooth elements comprise a second plurality of like, cylindrical pins extending parallel to each other between said second pair of annular members, and spaced uniformly about a pitch circle disposed coaxially of said first axis, and having a pitch diameter greater than that of the pitch circle for said first plurality of pins.

* * * * *